Patented Feb. 27, 1923.

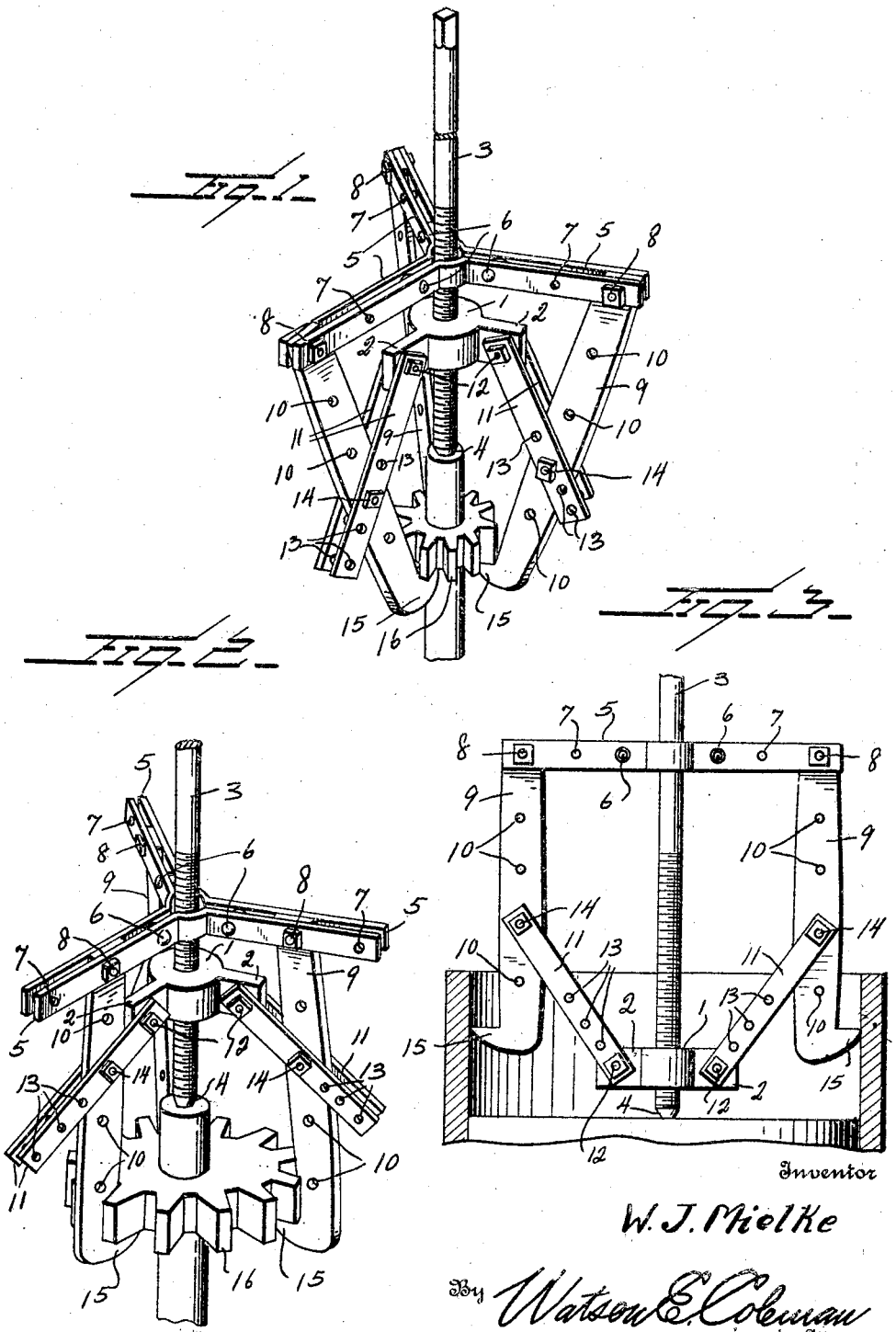

1,446,918

UNITED STATES PATENT OFFICE.

WILLIAM J. MIELKE, OF GUTTENBERG, IOWA.

GEAR OR WHEEL REMOVING DEVICE.

Application filed July 13, 1921. Serial No. 484,347.

*To all whom it may concern:*

Be it known that I, WILLIAM J. MIELKE, a citizen of the United States, residing at Guttenberg, in the county of Clayton and State of Iowa, have invented certain new and useful Improvements in Gear or Wheel Removing Devices, of which the following is a specification, reference being had to the accompanying drawings.

It is the purpose of the present invention to provide a device of this kind, which is simple, efficient and practical in construction and has a wide range of adjustment, for pulling or removing various sizes of wheels and gears from spindles or shafts.

Another purpose is to provide a device of this kind, wherein the gripping jaws and the connecting members between the operating screw and the jaws are capable of being reversed, whereby the operative connections between the jaws and the screw may be pushed outwardly, instead of pulling inwardly.

In the present device the construction is such, that the more the frame is pressed toward the work, the tighter the jaws will engage with the work, thereby preventing the jaws from slipping off, as the gear or wheel is removed from the spindle or shaft.

Still another purpose is the provision of a device of this character, wherein the jaws have their work engaging parts sharpened, so that the sharpened parts of the jaws may engage with a straight surface, where there are no shoulders, hence permitting the inner surface of a bore to be gripped, for removing a spindle or shaft therefrom.

While the design and construction at present illustrated and set forth is deemed preferable, it is obvious that as a result of a reduction of the invention to a more practical form for commercial purposes, the invention may be susceptible of changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a view in perspective showing the improved wheel or gear removing tool constructed in accordance with the invention, and applied, whereby a gear may be removed from the spindle;

Figure 2 is a view in perspective of the improved tool showing the jaws adjustable in different apertures of the links 11; and Figure 3 is a view in elevation, showing the jaws 9 reversed with their lugs or teeth 15 extending outwardly, and the links 11 reversed.

Referring to the drawings, 1 designates a suitable head, which is provided with a plurality of radial lugs 2. An operating screw 3 is threaded through the head, and is provided with a frusto-conical end 4, for engagement with a depression in the end of the spindle or shaft, for the purpose of removing a gear or wheel.

A frame 5 is provided, and through which the screw 3 passes. The screw has sufficient looseness of play through the frame, so that the jaws can accommodate themselves to the work. The frame 5 is made up of a plurality of bars, bent to provide arms extending at obtuse angles. The arms of the bars are relatively spaced as shown, and are secured together by the bolts 6. The arms of said bars have a plurality of registering apertures or openings 7, to receive bolts 8, which pass through the jaws 9. The jaws are also provided with a plurality of openings or apertures 10, through any of which the bolts 8 may pass. By attaching the bolts in any of the apertures 7 and 10, the jaws 9 may be adjusted relatively to the arms of said bars, in order to accommodate the gripping ends of the jaws to work of various sizes. Spaced links 11 are pivotally mounted on bolts 12, which pass through the lugs 2. These links 11 engage on opposite sides of the jaws, and are provided with a plurality of apertures or openings 13, through any of which, and any of the apertures 10, bolts 14 may engage, so as to adjustably connect the jaws 9 to the links, and relatively to the work to be removed, so that the jaws may accommodate themselves to work of different proportions. The lower ends of the jaws 9 have work engaging sharpened lugs or teeth 15, which, as shown in Figure 1 engage under the wheel or gear 16 to be removed from its spindle or shaft. After the heads 1 are adjusted and the projecting sharpened lugs of the jaws are engaged with the wheel, the screw 3 is rotated, until its frusto-conical end engages a depression in the end of the spindle or shaft. The screw is rotated, and pressure is applied upon the frame, hence the jaws are forced inwardly toward the work, while the screw acts to force the spindle or shaft from engagement with the gear or wheel with which it rotates. The screw 3 operates through the frame, and has looseness of play, so that in case the surface of the work is uneven, or is mounted upon the spindle irregularly, the biting lugs of the jaws may accommodate themselves to the irregularities of the work, and in this way remove the gear or wheel much easier from the spindle or shaft, than if the screw operated straight through the frame, without the looseness of play. Experience has disclosed the fact that gripping jaws of the present character do not break off easily, owing to their heavy and rigid construction relatively to the screw and the frame.

In Figure 3 the head is lowered, and the links are reversed, as well as the jaws, therefore by this manner of use the jaws may operate outwardly, instead of inwardly, due to pressure being applied upon the frame. Also the biting lugs will firmly engage into the surface of the work, thereby preventing the work from slipping, and insure the removal of the spindle or shaft.

The invention having been set forth, what is claimed as being new and useful is:

1. In a wheel removing tool, the combination with a head, of a screw operatively mounted therein and adapted to engage one end of the spindle, a plurality of jaws having work engaging ends, links adjustably connected to the jaws and in turn connected to the head, and a frame through which the screw is loosely guided, and means adjustably connecting the frame and the jaws, whereby upon applying pressure upon the frame, the jaws may operate toward the work from which a spindle or shaft is adapted to be removed.

2. In a wheel removing tool having a frame composed of bars, each bar bent to cause arms to be formed extending at an obtuse angle, the bars being arranged to dispose the arms radially from the center of the frame, whereby the arms of one bar may assume parallel relation with the arms of adjacent bars, jaws pivotally and adjustably depending from between said parallel arms and terminating in work engaging teeth at their lower ends, a head aligned axially with the center of the frame, a screw guided through the center of the frame and threaded through the head, pairs of links depending pivotally outwardly from the head and being adjustably pivoted to said jaws, whereby upon rotating the screw in one direction or the other, the teeth carrying ends of the jaws may operate toward and from the work, whereby one member may be withdrawn from engagement with another member.

In testimony whereof I hereunto affix my signature.

WILLIAM J. MIELKE.